United States Patent
Ramarathnam

(10) Patent No.: US 6,316,895 B1
(45) Date of Patent: Nov. 13, 2001

(54) MULTI-SPEED MOTOR CONTROLLER

(76) Inventor: Ramachandran Ramarathnam, 926 TVS Avenue, Annanager, West Extension, Chennai-600101, Tamil Nadu (IN)

( * ) Notice: Subject to any disclaimer, the term of this patent is extended or adjusted under 35 U.S.C. 154(b) by 0 days.

(21) Appl. No.: 09/435,420

(22) Filed: Nov. 8, 1999

(30) Foreign Application Priority Data

Sep. 1, 1999 (IN) ............................................. 867/MAS/99

(51) Int. Cl.$^7$ ................................. H02P 5/40; H02P 5/34
(52) U.S. Cl. ........................... 318/439; 318/256; 318/599
(58) Field of Search ..................................... 318/138, 139, 318/245, 254, 439, 799–823; 363/38, 39, 41, 42, 132, 80–84

(56) References Cited

U.S. PATENT DOCUMENTS

| | | | |
|---|---|---|---|
| 3,967,173 | * 6/1976 | Stich | 318/227 |
| 3,971,972 | * 7/1976 | Stich | 318/227 |
| 4,328,454 | * 5/1982 | Okuyama et al. | 318/803 |
| 4,346,434 | * 8/1982 | Morinaga | 364/183 |
| 4,520,298 | * 5/1985 | Abbondanti | 318/490 |
| 4,527,228 | * 7/1985 | Chi Yu | 363/98 |
| 4,544,868 | * 10/1985 | Murty | 318/254 |
| 4,599,550 | 7/1986 | Robertson et al. | 318/811 |
| 4,636,928 | 1/1987 | Deguchi et al. | 363/41 |
| 4,656,572 | 4/1987 | Caputo et al. | 363/41 |
| 4,758,938 | * 7/1988 | Kanazawa | 363/41 |
| 4,763,060 | * 8/1988 | Takahashi | 318/811 |
| 4,780,656 | * 10/1988 | Mitchell | 318/798 |
| 5,140,248 | 8/1992 | Rowan et al. | 318/811 |
| 5,264,775 | * 11/1993 | Namuduri et al. | 318/811 |
| 5,334,917 | * 8/1994 | Lind | 318/254 |
| 5,367,234 | * 11/1994 | DiTuci | 318/254 |
| 5,428,522 | * 6/1995 | Millner et al. | 363/63 |
| 5,495,160 | 2/1996 | Pond | 318/801 |
| 5,821,722 | * 10/1998 | Forbes et al. | 318/696 |
| 6,041,625 | * 3/2000 | Nagai et al. | 68/12.02 |
| 6,060,851 | * 5/2000 | Imai et al. | 318/437 |

OTHER PUBLICATIONS

J. Holz, "Pulse Width Modulation—A Survey", IEEE Transactions on Industrial Electronics, vol. 39, No. 5, pp. 410–420, 1992.

R.M. Park, "Two–Reaction Theory of Synchronous Machines", AIEE Transaction, vol. 48, No. 1, pp. 716–730, Jul. 1929.

T.G. Habetler, "A Space Vector based Rectifier Regulator for AC/DC/AC Converters", IEEE Transactions on Power Electronics, vol. 8, No. 1, pp. 30–36, 1993.

* cited by examiner

Primary Examiner—Paul Ip
(74) Attorney, Agent, or Firm—Needle & Rosenberg, P.C.

(57) ABSTRACT

Three phase sinusoidal waveforms generated from a DC bus voltage using Space Vector PWM method are used to obtain multi-speeds from a 3 Phase AC Induction motor. A novel algorithm generates the switching signals from a micro controller to drive the power devices of the Inverter Bridge, the output of which is applied to the motor. At different speeds, below the rated voltage of the motor, the output voltage V and the frequency f are maintained to keep V/f constant so that the motor torque is kept constant. At above the rated voltage of the motor, only the frequency is increased to obtain constant output from the motor at increased speeds.

28 Claims, 8 Drawing Sheets

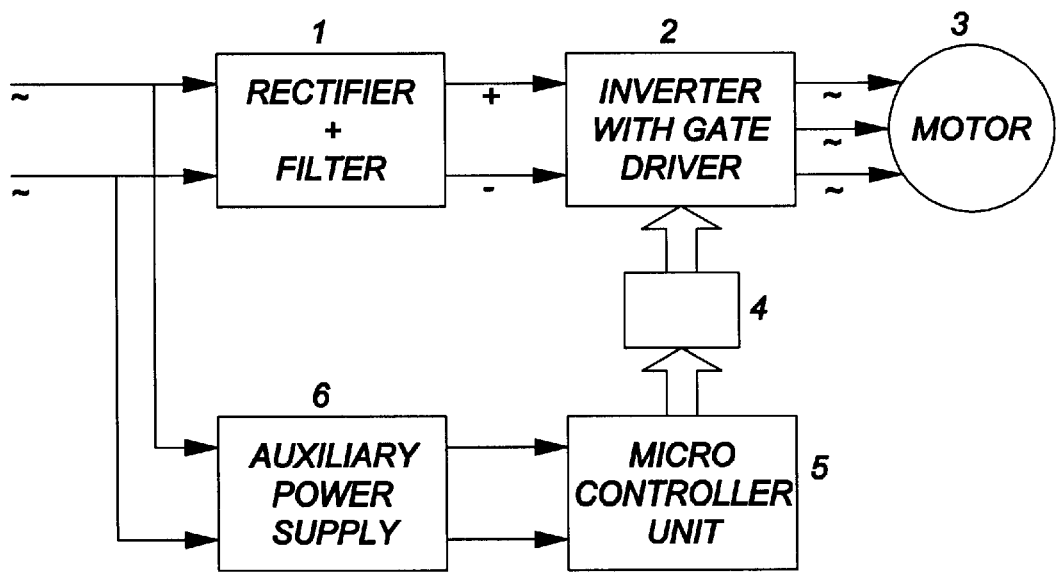
FIG : 1 - GENERAL SCHEMATIC
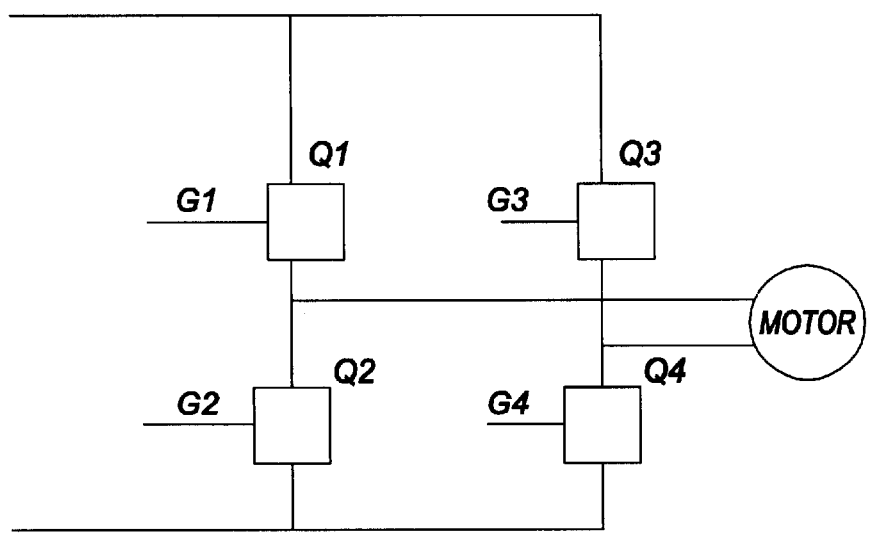
FIG : 2a - (Single Phase Bride)

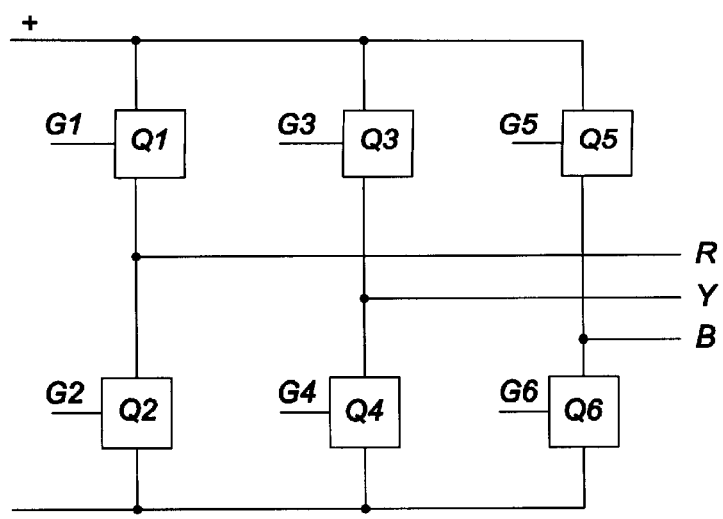
FIG : 2b - Inverter With Gates
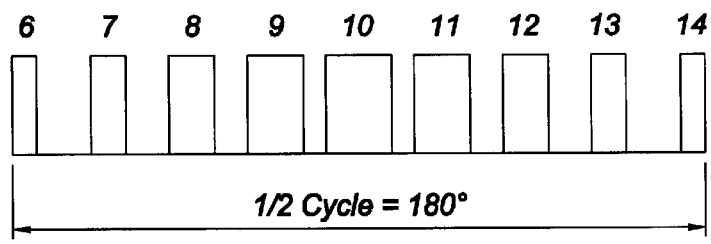
FIG : 3 - Pulse Width Modulation
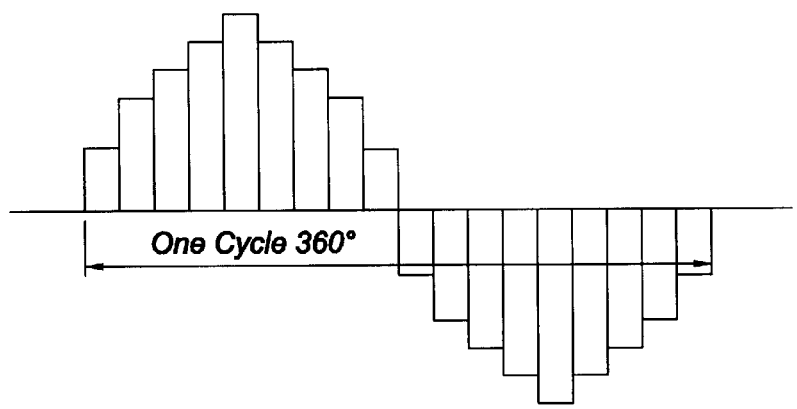
FIG : 4 - Build Up Of Sine Wave

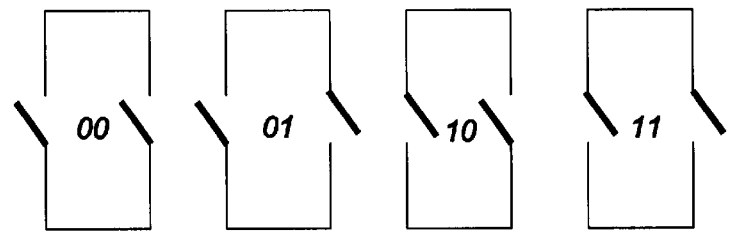
FIG : 5a - (Switching Configuration of single phase bridge)
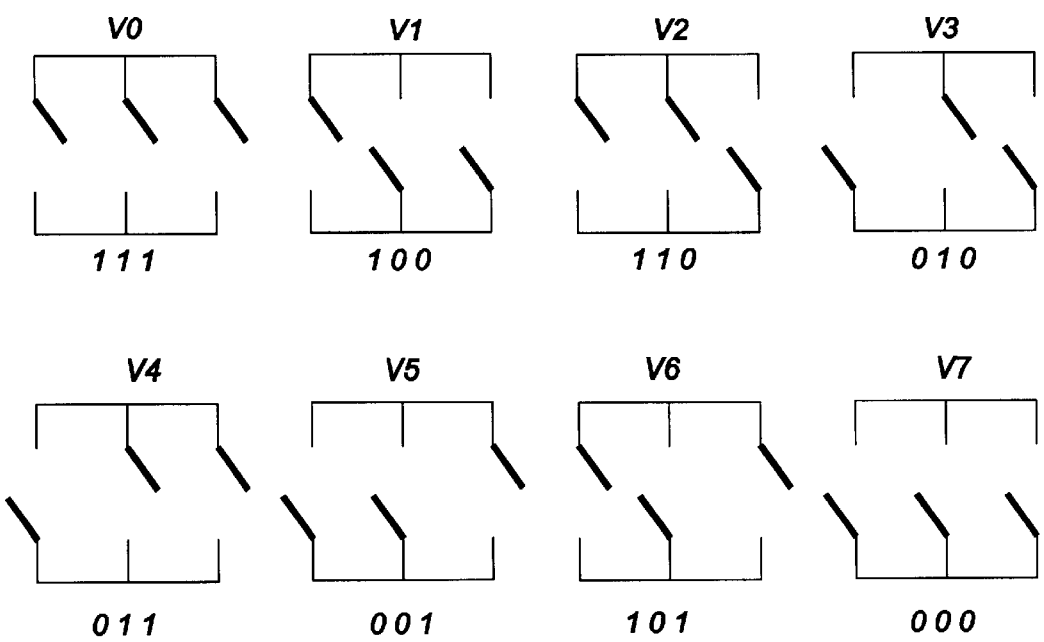
FIG : 5b - (Switching Configuration of Pwm 3 Phase Inverter

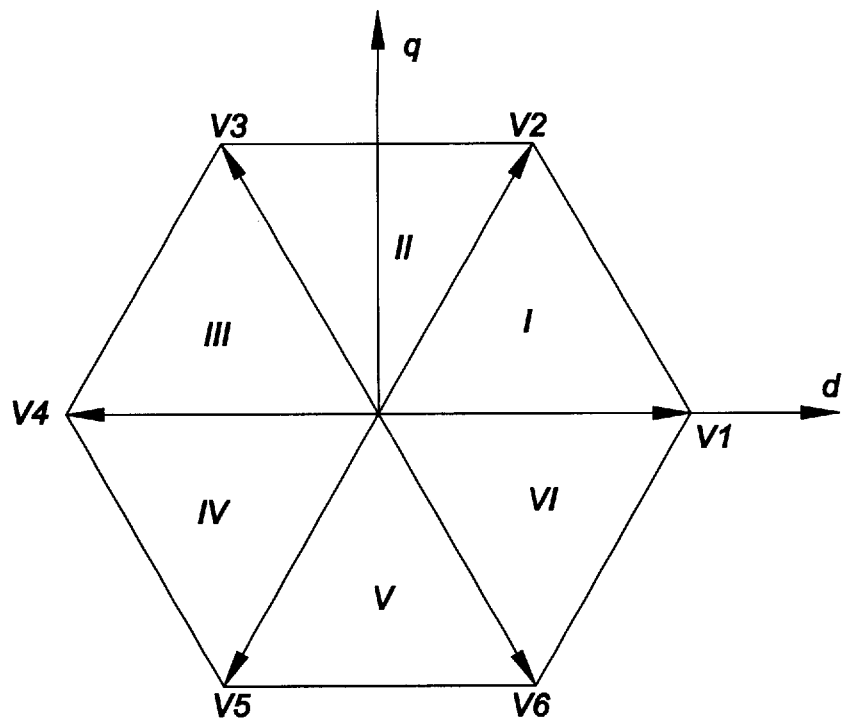
Vo & V7 : Zero Voltage Vector at Origin
FIG : 6 - Space Vectors
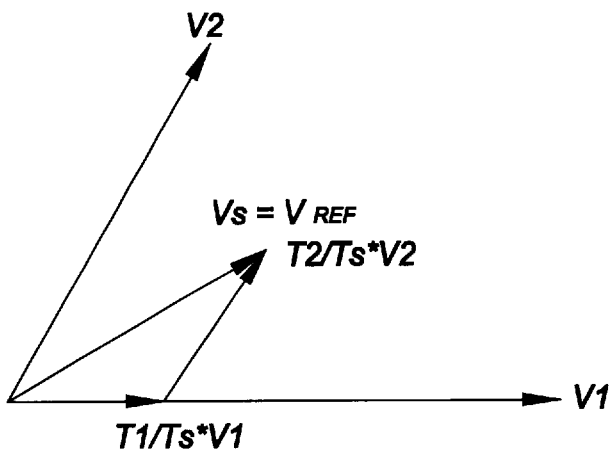
FIG : 7 - Decomposition Of The Voltage Vector

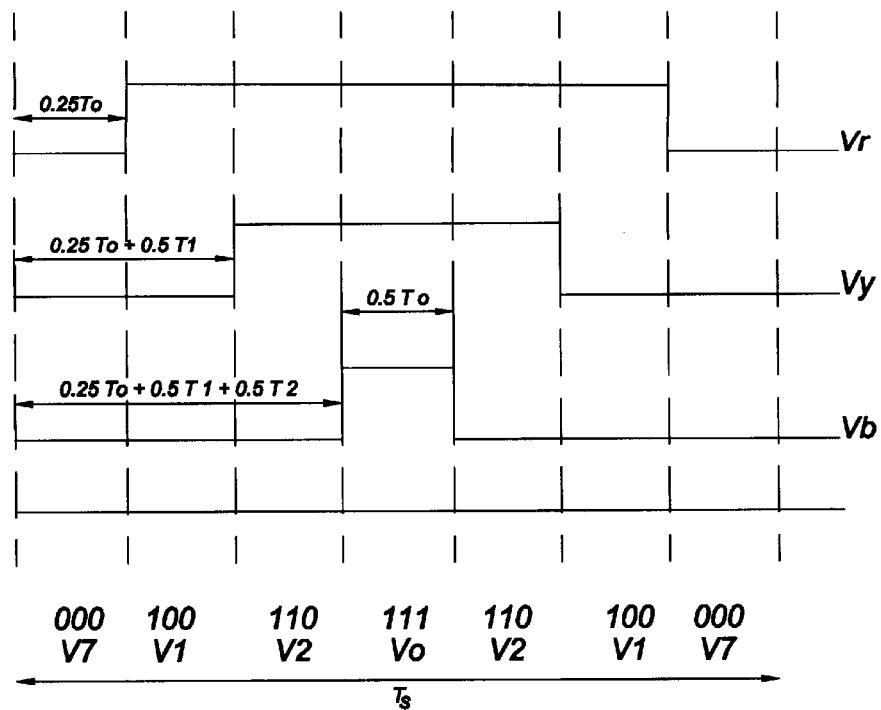
FIG : 8 - Symmetrical Space Vector Switching Pattern
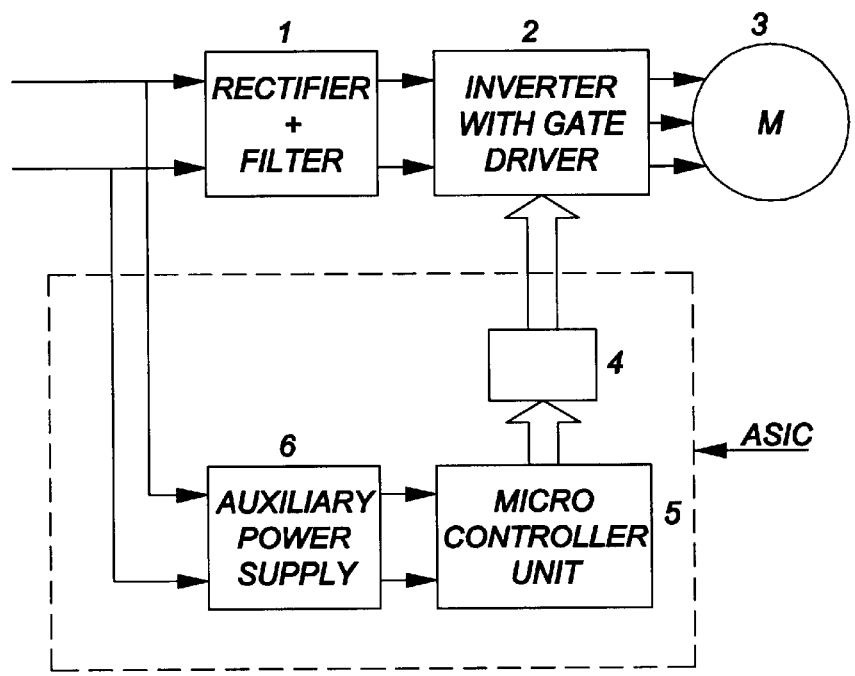
FIG : 9a

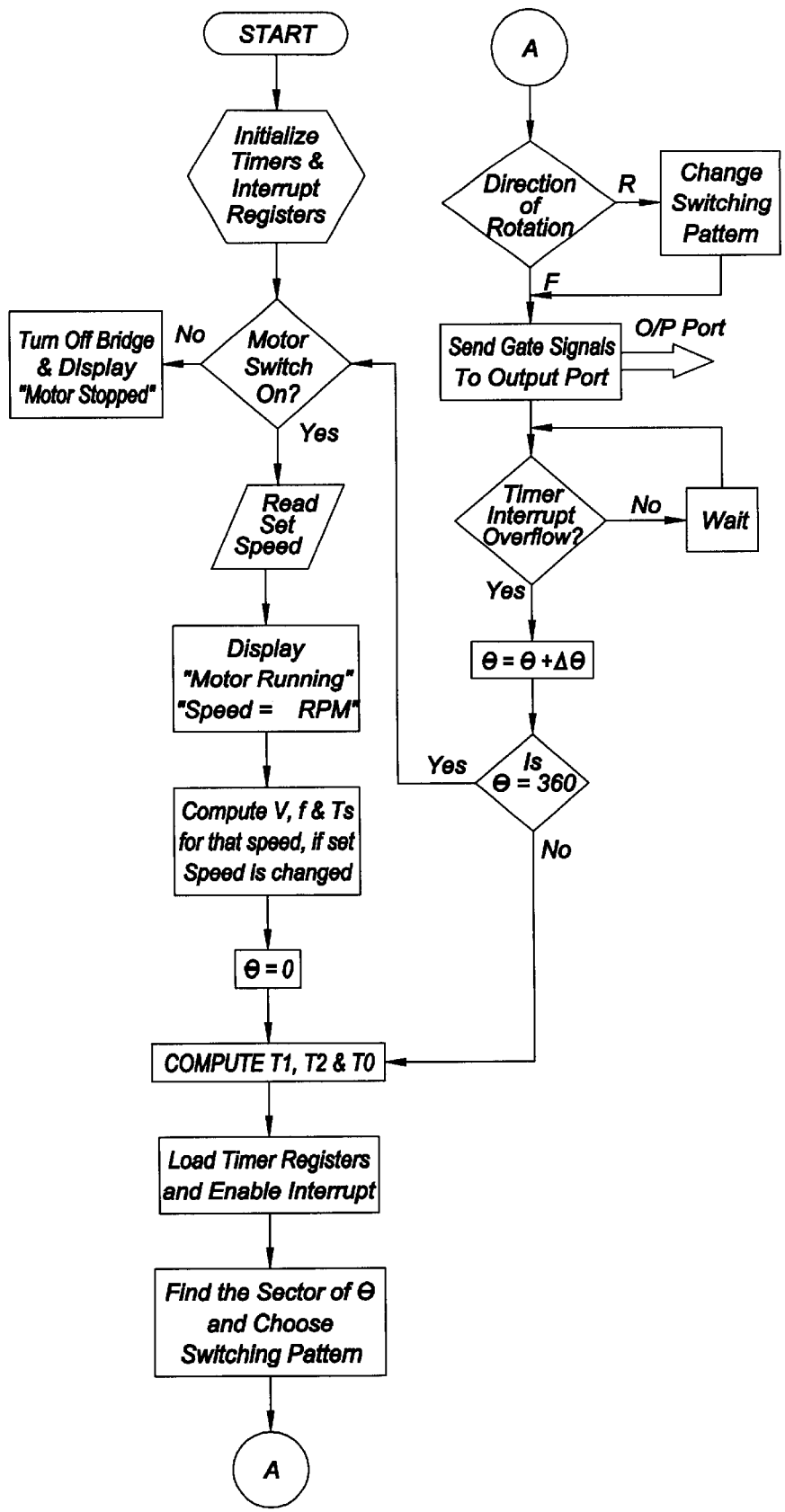
FIG : 9 - FLOW CHART

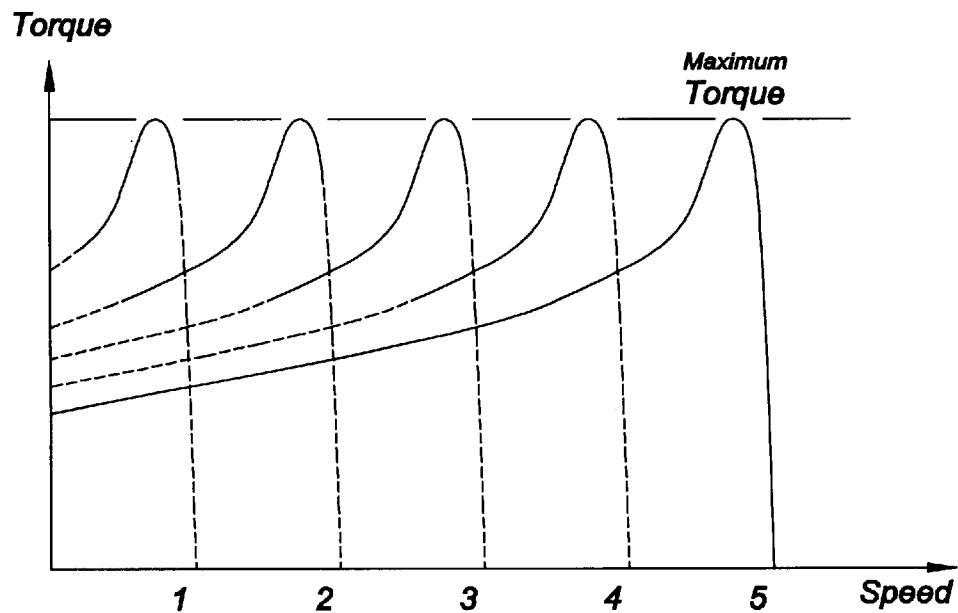
FIG : 10 - Torque Vs Speed during Soft Start
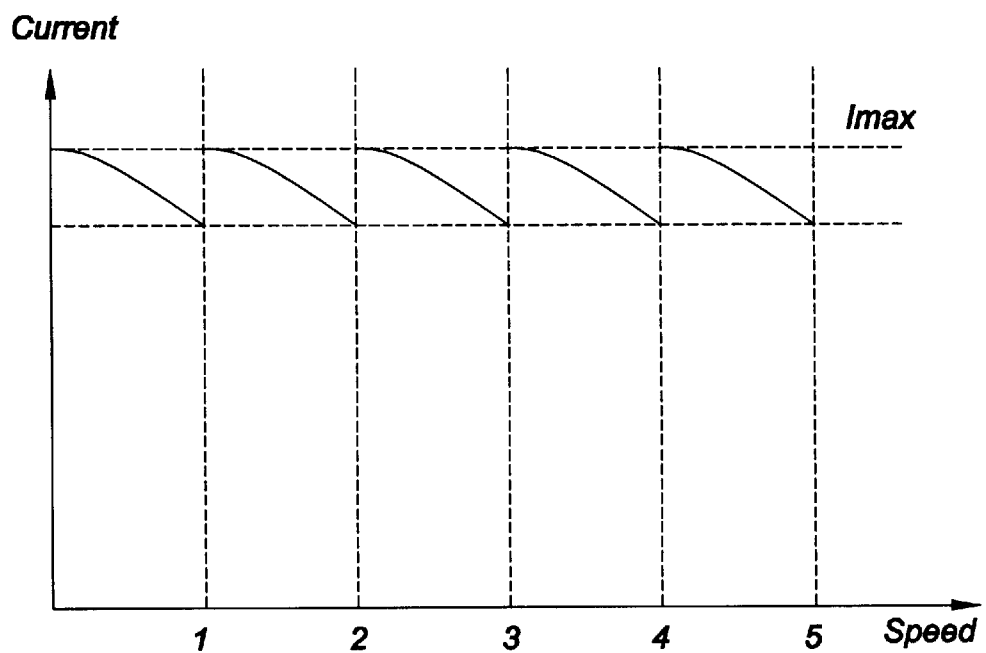
FIG : 11 - Current Vs Speed during Soft Start

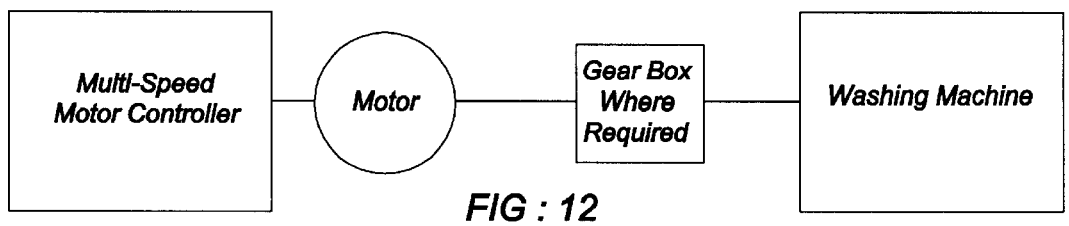
FIG : 12
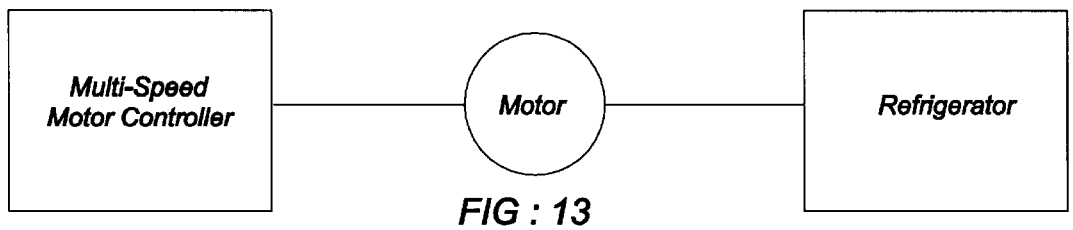
FIG : 13
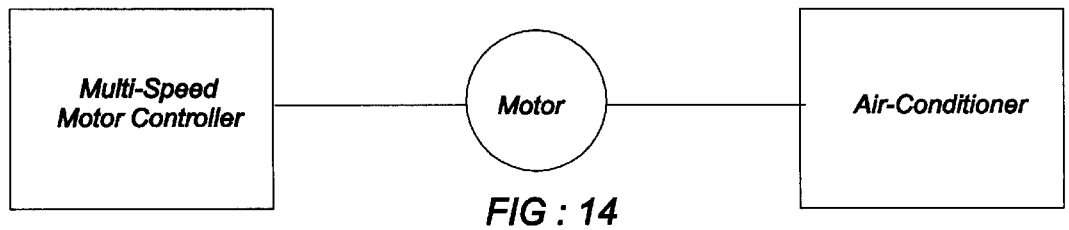
FIG : 14

MULTI-SPEED MOTOR CONTROLLER

This application claims the benefits of Indian Patent Application No. 867/Mas/99, filed Sep. 1, 1999, which status is pending.

FIELD OF INVENTION

This invention relates to a multi-speed motor controller for an AC motor or brushless DC motor and its application in high frequency tools, domestic appliances or industrial equipment.

BACKGROUND OF THE INVENTION

It is well known that wherever possible, 3 phase, squirrel cage induction motors are preferred for driving the load. However, when the load requires variable speed, in early days, DC motors were invariably deployed. While being easily amenable to speed control by simple means, the DC motors with the Commutator/Carbon Brush Gear are less reliable and prone to higher maintenance. Hence there has always been a concerted effort to find a simple solution for the speed control of the AC induction motor.

However the complexity of the speed control of the AC motor has been the major drawback vis-à-vis the DC motor. In a DC motor the speed control is very simple in that it is achieved by simply varying the voltage applied to the armature. But in induction motors, both the voltage and frequency have to be varied simultaneously. Also during the power conversion stage it is necessary to ensure that the output waveforms are as near to sinusoid as possible to minimize harmonic effects and reduce losses, noise and vibration. It has often been the goal of the designer to come out with a simple and cost-effective design of the power electronics and the Pulse Width Modulation (PWM) controller to achieve the variability of speed in the three-phase induction motor.

In the recent past there has been increasing efforts to devise ways and means of the variable voltage-variable frequency method of speed control of induction motors. This is mainly because the three phase induction motor is perhaps the most rugged and reliable rotating machine that forms the workhorse of the industry. Its die-cast cage rotor is virtually indestructible and the absence of commutator and brush gear makes these motors, the most widely used in the industry. Wherever possible and where a three-phase supply is available, the three-phase motor is preferred to the single-phase induction motor as well. The three-phase motor is also having the least weight and size for a given horsepower at a particular speed. The single-phase induction motor is generally less efficient than a three phase one and also has additional components like starting switch and capacitor. They bring down the reliability of the machine.

To vary the speed of the induction motor, both the voltage and frequency need to be varied in tandem below the rated speed of the motor. For speeds above rated value, only the frequency is varied while the voltage is kept constant. The general practice is to rectify and filter the input AC supply to DC and invert the same to variable voltage and variable frequency AC. While doing this it is preferable to have the output current waveform as near sinusoidal as possible. This is because the induction motor operates best with sinusoidal magnetic flux.

There have been many approaches to obtain such a sinusoidal variable voltage-variable frequency output from the inverter. Most of the earlier methods used analog circuitry with a lot of hardware to obtain the PWM wave generation. These circuits employ triangular carrier wave at a higher frequency and different sampling techniques to obtain the pulse width modulated output wave. Such analog circuits invariably have limitations in that they are complex and expensive. They are also prone to drift due to aging of the components and thermal run-away due to heating. Frequent factory and field adjustments of the circuitry are required. Also the design gets frozen once the product is made and even a minor change in the design later would necessitate another round of prototyping and fabrication. Also such hardware intensive circuitry always had the associated reliability problems and high costs.

Subsequently, in recent times there have been attempts to arrive at the solution to obtain the pulse width modulated, sinusoidal variable voltage-variable frequency output by means of employing microprocessor based controllers. Such an approach is engaging the attention of the contemporary designers as may be seen from U.S. Pat. Nos. 4,636,928, 4,599,550, 4,656,572, 5,140,248, 5,495,160, based on this approach.

The earlier approach in this method is to digitally store the waveform of the voltage in the read only memory (ROM) of the microcontroller and read the same at appropriate intervals by means of interrupts. The program suitably handles the interrupts and the output of the processor to send the switching signals to the inverter.

It was also suggested that the sine values during the entire 360° of one cycle of the waveform are stored in the form of a look up table and the program read the same at the regular intervals and appropriately switches the Inverter Bridge. In both these approaches the memory requirement of the program is generally large, of the order of 4K or more bytes. This is mainly because of the memory requirement of the look-up table as well as the main code itself. Also once the code is larger, it becomes necessary to deploy faster processors with lower instruction cycle times to effect the control in real-time and such hardware add to the cost.

In another case a mathematical approach was adopted to digitally generate the sinusoidal wave. In this a mathematical algorithm based on the Bresenham technique was used to synthesize a circle and two waves corresponding to the x and y coordinates are generated to follow the contour of this reference circle. These digital sine waves are then converted by means of a ⅔-phase converter and modulator to obtain the three phase, pulse width modulated signals. Here also equipment employs quite a bit of hardware in the form of Timers, Counters, Frequency units, Multiplexers and other logic units which makes the apparatus quite expensive to be deployed in price sensitive applications.

There are several PWM techniques as described by J. Holz in his research paper, "Pulse Width Modulation—A Survey", IEEE Transactions Industrial Electronics, vol. 39, no. 5, pp. 410–420, 1992. The principle and the methodology involved are described in greater details in publications given below:

R. M. Park, "Two—reaction Theory of Synchronous Machines, Part. I, Generalized Method of Analysis", AIEE Trans., vol. 48, no. 1, pp. 716–730, July 1929.

T.G. Habetler, "A Space Vector-Based Rectifier Regulator for AC/DC/AC Converters", IEEE Trans. Power Electronics, vol. 8, no. 1, pp. 30–36, 1993.

One of the objects of the invention is to obviate the above drawbacks by varying the magnitude and frequency of the applied voltage, while keeping the output waveform of the inverter as close to sinusoidal as required by using a microprocessor based controller, which is programmable to achieve the switching configuration as required by SVPWM or Sinusoidal PWM (SPWM) technique.

Another object of this invention is to keep the code length and the memory requirement of the microprocessor at a minimum level so that SVPWM or SPWM can be implemented at a low cost and the controller can be used in appliance motors, high frequency tools and industrial equipment.

SUMMARY OF THE INVENTION

To achieve these and other objectives this invention provides a multi-speed motor controller for AC motor or brushless DC motor including:

a rectifier for rectifying the AC input to a DC;
  the said rectifier is connected to a PWM bridge inverter consisting of power transistors with corresponding gates;
  the output of the said PWM bridge inverter is connected to an AC motor or brushless DC motor;
  a controller unit connected to the said PWM bridge inverter having a software program of short code length for determining the timing sequences for generating the signals for switching ON and OFF the gates of the power transistors of the said PWM bridge inverter in order to produce Variable Voltage Variable Frequency (VVVF) sinusoidal voltage wave forms for controlling the speed of the said AC motor or brushless DC motor using space vector pulse width modulation (SVPWM) or sinusoidal pulse width modulation (SPWM) technique; and
  an auxiliary power supply means for the controlling unit and the gates drivers connected to the said DC input.

The AC motor is a single-phase motor or a three phase motor or a poly-phase motor. The AC motor is an induction, reluctance or synchronous motor.

The brushless DC (BLDC) motor is in two or three phases with two or three pairs of windings.

The PWM bridge inverter (single phase inverter) includes at least 4 power transistors with corresponding gates in case a single-phase motor is connected at its output.

The software program provides not more than four switching configurations of the single phase inverter bridge to produce variable voltage variable frequency (VVVF) sinusoidal voltage wave form for controlling the speed of the single phase motor using space vector width modulation (SVPWM) or sinusoidal pulse width modulation (SPWM) technique.

The PWM bridge inverter (three-phase inverter) includes at least six power transistors with corresponding gates and the AC motor connected to the output of said PWM bridge inverter is a three-phase motor or brushless DC (BLDC) motor with three pairs of windings (three-phases).

The software program provides not more than eight switching configurations of the three phase inverter bridge to produce variable voltage variable frequency (VVVF) sinusoidal voltage wave form for controlling speed of the three phase motor or BLDC motor with three pairs of winding using space vector width modulation (SVPWM) or sinusoidal pulse width modulation (SPWM) technique.

Two single phase PWM bridges totaling eight power transistors are provided for BLDC motor with two pairs of winding (two-phase motor), the output of each of these two bridges is connected to the two winding pairs such that the output of second winding is delayed by 90° from the first one.

The software program manipulates switching configurations of the inverter bridge to produce variable voltage variable frequency (VVVF) sinusoidal voltage wave form for controlling the speed of the poly-phase motor using space vector width modulation (SVPWM) or sinusoidal pulse width modulation (SPWM) technique.

The controller unit is a micro-controller with the associated processor, ROM, RAM and the input/output (I/O) ports having said software program in ROM to produce timing signals sent through the output port to the driver IC.

The power transistors in the PWM bridge inverter are of MOSFET (metal oxide semi-conductor field effect transistor) type or insulated gate bipolar transistor (IGBT) type to make the gate driver circuitry simple.

The timing sequences are such that the idle period of the bridge is distributed in three stages, one in the beginning, one in the middle and the third at the end of the PWM cycle in a manner that produces a symmetric pattern with respect to the center of the switching period.

The software program in the micro-controller is such that it obtains the maximum utilization of the said input DC voltage.

The software program generates a symmetric pattern of timing signals thereby producing variable voltage variable frequency (VVVF) sinusoidal voltage wave forms with the least harmonic content.

The short code length of the program is in range of 100–1000 bytes.

The short code length of the program is preferably in range of 200–400 bytes.

The software program includes means to generate dead band in the switching signals to ensure that at no point of time any two power transistors in the same leg of PWM bridge inverter are conducting simultaneously.

The software program includes means to obtain the set speed of the AC motor or brushless DC motor from the operator console.

A driver to charge the gate capacitor is connected to the gate for turning the transistor 'ON'.

The driver is a three-phase version gate driver IC to drive the three low sides and three high sides transistors of the PWM inverter.

The auxiliary power supply means generates the 5V, 15V DC required for powering the micro-controller and the driver respectively.

The software program fuirther includes soft-start means.

The controller unit with the driver IC and the auxiliary power supply means is implemented in ASIC (Application Specific Integrated Circuit).

The ASIC and the passive components of the multi-speed motor controller are integrated in a hybrid IC.

The ASIC has means to interface with an external memory chip, if required.

The multi-speed motor controller is provided with means to interface with domestic appliances and industrial equipment to control the speed variation to suit the individual need of the customer.

The domestic appliances and the industrial equipment are selected from the group of washing machine, refrigerator, room air-conditioner, textile ring frame, fans, blowers, compressor and machine tools.

The invention will now be described with reference to the accompanying drawings.

BRIEF DESCRIPTION OF THE FIGURES

FIG. 1 is a block diagram that shows general schematic of the multi-speed motor controller for an AC motor or a brushless DC motor.

FIG. 2a shows a PWM bridge inverter consisting of 4 transistors with corresponding gates for a single phase induction motor.

FIG. 2b shows a PWM bridge inverter consisting of 6 transistors with corresponding gates for a three-phase induction motor.

FIG. 3 shows the voltage wave form of one phase for a half cycle of the time period. The amplitude of the wave is constant and the on-time of the pulses is continuously varying as per the requirement of SVPWM.

FIG. 4 shows the average voltages for different PWM cycle periods, over a complete cycle of the waveform. The staircase type build-up of the waveform approximating the sinusoid pattern is also evident therein.

FIG. 5a illustrates the four possible switching combinations of the four power transistors.

FIG. 5b illustrates the eight possible switching combinations of the six power transistors, three-phase inverter bridge. The ON or OFF state of the bottom side power device of the bridge is considered to denote the state of the bridge. The eight possible combinations are $V_2$–$V_7$. $V_0$ and $V_7$ represent the bridge in OFF or non-conducting condition in that either all the three bottom or the top power devices are in OFF State. In all the other six states $V_1$–$V_6$, the bridge is in ON State. One or two of the topside devices and two or one of the other bottom side devices are in ON State.

FIG. 6 shows the Space Vectors corresponding to the above-mentioned configurations and they are represented by the six space vectors, $V_1$–$V_6$. The null vectors $V_0$ and $V_7$ positioned at the origin represent the other two combinations, where the bridge is in non-conducting state.

FIG. 7 illustrates that the required stator reference voltage vector $V_{ref}$ is resolved into two space vectors, $V_1$ and $V_2$.

FIG. 8 illustrates the inverter-switching pattern for the above-mentioned case, involving spavectors $V_1$ and $V_2$.

FIG. 9 gives the general flowchart of the program and the logic involved therein, to generate the gating signals from the micro-controller as per the Space Vector PWM algorithm. The interface with the operator console and the interrupt handling routine is also explained therein.

FIG. 9A shows the microcontroller unit, auxiliary power supply and the driver IC implemented in ASIC.

FIG. 10 shows the step by step incrementing of the frequency and speed and the shifting of the maximum torque position with soft-start mechanism.

FIG. 11 shows the variation of the current with speed as the motor is accelerated in the soft-start mode, the inrush current is limited to $I_{max}$ during the entire acceleration period.

FIGS. 12–14 show the application of the invention in washing machines, refrigerators and air-conditioners. The multi-speed motor controller may be connected to the motor of the washing machine, refrigerator or air conditioner with the help of gearbox if required and thus add versatility to the equipment that is being controlled. Being software based, the system can be easily customized to suit the individual needs of the customer. The time to market is greatly reduced because of this feature and this is a major advantage in the hands of appliance and equipment manufacturers.

DETAILED DESCRIPTION OF THE INVENTION

Referring to the drawings in FIG. 1 the general layout of the motor controller is described. The input AC supply is rectified and filtered through a rectifier and/or filter (1) to a DC. The input can be single or three-phase, single-phase being more common for appliance motors. The PWM bridge inverter (2) includes of either 4 power transistors for single phase motor (FIG. 2a) or six power transistors for three-phase motor (FIG. 2b). The power transistors can be MOSFETs (Metal Oxide Semiconductor Field Effect Transistor) or IGBTs (Insulated Gate Bipolar Transistor). With the present technology in the field of power semiconductors, it is easy to achieve the output rating of the bridge of the order of about 20 HP, using discrete devices. Both MOSFET and IGBT are preferred because the gate of the device is insulated from the other terminals of the transistor and hence it is easier to design the gate driver circuitry.

In FIG. 2b the PWM bridge inverter (2) is explained in greater detail. Q1–Q6 are the six transistors and G1–G6 are the corresponding gates. When a high signal (1) is given to the gate, the transistor is turned ON and a low signal (0) at the gate turns the transistor OFF. The micro-controller (5) generates the switching logic that governs these signals. It is to be ensured that no two complementary pairs of transistors; Q1/Q2, Q3/Q4 or Q5/Q6 are turned ON simultaneously at any time, lest the DC Bus is shorted. For turning the transistors ON, the high signal should have sufficient strength to charge the gate capacitor. For this, there are special Gate Driver ICs available. In fact a three-phase version of one such IC (4) is used in the present invention. The IC is able to drive the three low side and the three high side transistors, inherently providing for the offset voltage that is required for driving the high side transistors. The three output voltages at R, Y and B are connected to the three windings of the motor M as shown in FIG. 1.

The controller shown in FIG. 1 is a micro-controller (5) with the associated processor, ROM (Read Only Memory), RAM (Random Access Memory) and the Input/Output (I/O) ports. The unique software reside in the ROM and the processor executes the instructions as per the logic to achieve the SVPWM triggering signals that are sent through the Output port to the driver IC (4). The microcontroller also read the operator console/keypad periodically and check for the set-speed. In the case of open loop control the output voltage and frequency is adjusted according to the values demanded by the set-speed. In the close-loop version the controller checks the speed sensor in addition and change the gate signals according to the changes observed in the value of the output speed. The logic of the SVPWM as well as a description of the program is given subsequently.

The auxiliary power supply (6) shown in FIG. 1 supplies the 5 V and 15 V DC that is required for powering the micro-controller IC and the driver IC respectively. The power supply (6) keeps the dual output voltages fairly constant for a wide range of input supply fluctuations.

The principle of the Space Vector PWM (SVPWM) is explained briefly here. The stator voltage of the motor can be expressed vectorially in terms of the three phase voltages of the inverter as $$V_s = V_r + \gamma V_y + \gamma 2 V_b \text{ where } \gamma = \exp(j*2\pi/3)$$

The three phase voltages of the inverter are separated in time by 120° from each other and can be expressed as:

$V_r = V_m \sin\omega t$
$V_y = V_m \sin(\omega t - 120)$
$V_b = V_m \sin(\omega t + 120)$ where $V_m$ is the amplitude of the fundamental component.

In FIG. 5a, four basic switching combinations of the inverter for a single phase motor are shown. In FIG. 5b, the eight basic switching combinations of the inverter for three-phase motor are shown. When all the three topside or all the bottom side transistors are in OFF condition, the bridge does not conduct and the resultant stator voltage vector Vs is zero in these two states. In all the other six combinations, one or two of the topside transistors Q1, Q3 and/or Q5 conducts. As per the basic requirement of the bridge, the corresponding bottom side transistors must be in OFF state. The resultant stator voltage Vs corresponding to these six combinations can be given by the following equation as $$V_n = \frac{2}{3} * V_d * \exp[j*(n-1)*\pi/3]$$

where n=1, 2, 3, 4, 5, 6 and $V_d$ is the DC Bus voltage.

As explained earlier $V_0$ and $V_7$ are null vectors, i.e., their value is zero. These six vectors are shown in FIG. 6 as $V_1$ to $V_6$. They form the spokes of the hexagon that is formed by the six sectors, I to VI. The stator voltage vector Vs rotates in a cyclic pattern through these six sectors. Its value is variable from zero at the origin to the maximum represented by the radii of $V_1$ to $V_6$.

Depending upon the sector in which the stator reference voltage vector is located, the same can be written in terms of the adjacent two vectors of the hexagon. This is explained in FIG. 7. Assuming Vs is located in sector I, it is made up of $V_1$ and $V_2$ and expressed in terms of them as $$V_s = V_1 * T_1/T_s + V_2 * T_2/T_s.$$

When $T_2$ is zero, $V_s$ is entirely made up of $V_1$ and when $T_1$ is zero the same is made up entirely of $V_2$. $T_1$ and $T_2$ are the periods for which the Inverter Bridge is conduction in the corresponding configurations, i.e., 100 and 110. $T_s$ is the PWM switching period and since $T_1$ and $T_2$ are the two conducting periods of the bridge, the period $T_0 = T_s - (T_1 + T_2)$ represents the period for which the bridge is in non-conducting state. Thus the PWM period $T_s$ is made up of the bridge conducting in configuration 100 ($V_1$) for a time $T_1$ and in configuration 110 ($V_2$) for a time $T_2$ and the configuration 000 ($V_7$) or 111 ($V_0$) for a period $T_0$.

The above switching combinations for synthesizing the stator reference voltage vector $V_s$ in sector I is shown in FIG. 8. Here the period $T_0$ for which the bridge is idle is distributed in three stages, one in the beginning, one in the middle and the third at the end of the PWM cycle. The bridge is in state 000 ($V_7$) for a period $T_0/4$ where all the three transistors Q1, Q3 and Q5 in the topside are in ON state and the corresponding bottom side transistors Q2, Q4 and Q6 are in OFF state. At the end of period $T_0/4$, Q1 is turned OFF and Q2 is turned ON. This switching configuration is maintained for a period $T_1/2$. At the end of this period, the transistor Q3 is turned OFF and Q4 is turned ON. This new configuration is kept up for a period of $T_2/2$. At the end of this period, the transistor Q5 is turned ON and Q6 is switched OFF. Now the bridge is again nonconducting and the configuration will correspond to the null vector 111 ($V_0$). This state is maintained for a period $T_0/2$.

For the rest of the PWM period the situation repeats in the reverse. At the end of the period $T_0/2$, the transistor Q5 is turned OFF and Q6 is turned ON. This state is for a time period $T_2/2$. At the end of this period Q3 is turned OFF and Q4 is turned ON for a firther period $T_1/2$. After this Q1 is turned OFF and Q2 is turned ON. This corresponds to the non-conducting stage of the bridge and continues for a period $T_0/4$.

The switching signals for the three legs of the bridge is shown in FIG. 8 and it can be seen that the pattern is syrmnetric with respect to the center of the switching period $T_s$. This is known as the synmetric PWM switching method and this is known to produce least hannonics in the output waveforms.

The switching sequence described above is one PWM period and at the end of this, the next period corresponding to another position of the stator reference voltage $V_s$ occurs. As long as $V_s$ is in sector I, the adjacent space vectors $V_1$ and $V_2$ are taken and the period $T_1$ and $T_2$ are the dwelling periods. $T_1$ and $T_2$ can be calculated from the Park transformation explained in the reference cited above. The time periods $T_1$, $T_2$ and $T_0$ are given by the following equations:

$$T_1 = T_s/2 * a * \sin(60-\theta)/\sin 60$$

$$T_2 = T_s/2 * a * \sin\theta/\sin 60$$

$$T_0 = T_s - (T_1 + T_2)$$

$\theta$ is the phase angle of the stator reference voltage $V_s$ and a is the modulation index. 'a' is the ratio of the required magnitude of the voltage $V_s$ to the maximum possible value of the same, i.e., $|V_1|$. This is how the magnitude of the output voltage is controlled with respect to the frequency to obtain the required V/f.

As the stator reference voltage vector $V_s$ is rotated in time, by increasing $\theta$, the time periods $T_1$, $T_2$ and $T_0$ are continuously changing. At some point of time the vector enters sector II. Here the base vectors are taken as $V_2$ and $V_3$, corresponding to the switching configurations 110 and 010 respectively. The stator voltage vector $V_s$ is now made up of $V_2$ and $V_3$ and $T_1$, $T_2$ and $T_0$ are calculated as before. Thus the sequence progresses through sectors III, IV, V and VI as $\theta$ increase from 60 to 360°. For each of these sectors the corresponding adjacent pairs of the hexagon are taken for decomposition of the vector $V_s$ into the two required vectors. The rotation from 0 to 360° will correspond to one cycle of the output waveform. The incremental value of $\theta$ will determine the resolution of the sine wave. The fmer it is, smoother will be the sine wave.

The PWM pulses of one phase are shown in FIG. 3. For illustration it is taken that a half cycle is made up of nine pulses or PWM periods. Thus $\theta$ has a value 20°. It is seen that while the magnitude of the pulse is constant, the width of the pulse increases progressively in the first half and then reduces similarly in the second half of the time period shown. Pulses 6 to 10 are seen to have increasing widths and in pulses 10 to 14, the width progressively decreases.

The average value of the voltage over the PWM period thus increases steadily in the period 0 to 90° and then decreases in a similar fashion from 90 to 180°. This is shown in FIG. 4 for the complete cycle as a staircase like wave. As the number of steps increases, the staircase width reduces and the wave becomes smooth and closer to a sinusoid. The number of steps or the resolution of the waveform is entirely decided by the design of the motor and the requirement of the application. The fineness of the sine wave dictates the incremental value of $\theta$. The SVPWM method also results in the maximum utilization of the DC bus voltage, when compared to other types of PWM techniques.

The rotation of the space vector in the time frame is thus repeating and the rate at which the vector $V_s$ is rotating will decide the frequency of the output wave. Thus the frequency of the wave is decided by the speed of rotation of the stator voltage vector and its magnitude by the modulation index. The magnitude of the voltage is indirectly fixed by the time periods $T_1$ and $T_2$ for which the bridge is switched ON at different instances. The V/f control that is required for the speed control of the AC motor is obtained this way.

It is seen that while switching the bridge from one configuration to another, the On/OFF states of the two transistors in one vertical leg of the bridge, viz., Q1/Q2, Q3/Q4 or Q5/Q6 undergo a change. For example in FIG. 8, when at the end of $T_0/4$ when the configuration changes from 000 ($V_7$) to 100 ($V_1$), transistor Q1 changes from ON to OFF state and simultaneously the transistor Q2 changes from OFF to ON state.

While switching OFF, a transistor takes some definite time to turn OFF. This time $t_q$ is determined by the turn-off time of the transistor. In the example cited, it is imperative that Q2 is not turned ON before Q1 is completely turned OFF. Thus a small time delay is required before switching OFF Q1 before switching ON Q2. This time period in which both Q1 and Q2 are not conducting is known as the "dead band" and this dead-band is to be incorporated in the software for switching to ensure that at no point of time Q1 and Q2 (or Q3 and Q4 or Q5 and Q6) are conducting simultaneously. In the present invention this dead-band is incorporated in the algorithm itself by means of software and hence the reliability of the inverter bridge is very high.

In FIG. 9 the flow-chart of the program for the Space Vector PWM is described. The timers and interrupt registers of the micro-controller are cleared first. First it is checked if the Motor On control is activated-otherwise the controller sets the bridge in the non-conducting state, which is also the default mode. If the switch is in ON position, the set speed value is read from the operator console or keypad. The frequency corresponding to the set speed and the corresponding voltage are computed. Depending on the switching frequency of the bridge, the PWM period, $T_s$ is also calculated. θ is initialized to the value zero first and corresponding to that θ, the sector of the voltage vector $V_s$ is determined and the time period $T_1$, $T_2$ and $T_0$ are computed. The two composition-vectors $V_n$ and $V_n \pm 1$ for that sector are determined and the related switching configuration of the bridges for $T_1$ and $T_2$ are taken.

The program loads the timer registers with the values of $T_0$, $T_1$ and $T_2$ and the interrupt is enabled. The program also checks for the required direction of rotation and the direction of rotation of the stator reference voltage vector $V_s$ is accordingly initiated. It for clock-wise rotation of the shaft, $V_s$ is to be rotated clock-wise, for CCW rotation of the motor $V_s$ also moves anti-clockwise. The switching pattern for $T_0$ is course $V_7$ or $V_0$ as the bridge is in non-conducting state during that time.

The gating signals for each of the time periods, $T_0/4$, $T_1/2$, $T_2/2$, $T_0/2$, $T_2/2$, $T_1/2$ and $T_0/4$ corresponding to the switching pattern of the vectors $V_7$, $V_n$, $V_{n\pm1}$, $V_0$, $V_{n\pm1}$, $V_n$ and $V_7$ are sent to the output port of the controller for onward routing to the gates of the inverter bridge. The program also ensures that, during the transition instances at each of the seven time periods, the appropriate dead-band pattern is also sent to the gates via the output port. The switching pattern consists of six bits of 1 or 0. For instance a byte 100101 at the output port means that the transistors Q1, Q4 and Q6 are all ON and the transistors Q2, Q3 and Q5 are all OFF.

The program also checks if the timer overflow occurs and if so increments the value of θ and repeats all the above steps of the subroutine. Whenever the value of θ reaches 360°, it means that one cycle of the wave is completed. In this case θ is initialized to zero and the entire program is repeated. This process goes on endlessly, each time checking for any change in the set speed. If there is a change in the value of the set speed, new values of f, V are calculated. This will change the rate at which Vrotate and the modulation index, thereby changing the values of $T_0$, $T_1$ and $T_2$ as well.

The program occupies only about 200–400 bytes of ROM in the processor, depending on the smoothness of the sine wave required. This means that this is a very efficient code and can easily be implemented on any low-end micro-controller at a very low cost. There are also no large tables that are to be stored as the SVPWM is implemented in real-time. The remaining part of the ROM can be utilized to interface the controller with the machine that is being driven to control the timing and sequence of the same, along with the necessary input/output interfaces. As most of the present-day appliances are increasingly using micro-controllers, the present invention can easily enhance the capability of the same by providing the machine with variable speed capability at practically no extra cost. But the versatility and product features of the machine are greatly improved, offering the designer with a powerful but low cost tool in the form a variable speed motor. The designer unfettered by the earlier limitations of the controllability of the AC motor and has the freedom of choice to use the same in the place of a more expensive, larger and costlier DC motor.

Thus the motor will run at the appropriate value corresponding to the set speed. The smoothness of the sine wave is easily achieved by decreasing the incremental value of θ. The dead-band pattern for each of the transition points of the symmetric SVPWM switching pattern is constant and the time of the dead-band is loaded via the program. For a different set of transistors with varying $t_q$ it is very easy to vary the dead-band.

Similar exercise is carried out with PWM bridge inverter (single phase inverter) having four power transistors with four switching configurations, as shown in FIGS. 2a and 5a to provide a multi-speed for a single phase motor. For a single phase motor there are two space vectors and four basic switching combinations. The software program in the micro-controller calculates the dwelling times for each of these configurations and the corresponding dead band program is also inserted in the appropriate place like in the case of three-phase circuit.

A brushless DC (BLDC) motor is similar to poly-phase induction motor in construction except that in the brushless DC motor, the rotor is a permanent magnet in stead of die-cast aluminum. Generally, the BLDC motor come in 2 or 3 phases with 2 or 3 pairs of windings and the switching is done in a similar manner as two or three phase motor, while the three phase version is similar to the one, which has been described above, in the two phase motor there are two single phase bridges totaling eight power transistors. The output of each of these bridges is connected to the two winding pairs. The output of the said winding is delayed by 90° from the first one. When the voltages are applied in a cyclical fashion to the windings as described above, a rotating magnetic field is setup and the permanent magnet rotor follows this field and revolves continuously.

In FIGS. 10 and 11, the soft-start features are shown. FIG. 10 shows the torque Vs. speed curves for the 5 steps, while FIG. 11 illustrates the variation of current with speed for the same steps. The inverter and hence the motor is started in step 1 at a low frequency and its corresponding voltage. The starting torque is very high and the starting current is well within the allowed value of $I_{max}$. As the motor accelerates and the speed reaches the value to step 2, the current value also decreases. At this point both the voltage and the frequency are increased. The maximum or pull out torque point is shifted to the right. The motor shows an increase in accelerating torque and the speed further picks up. The current also increases but is kept within $I_{max}$. Similar exercise is carried out at steps 3, 4 and 5. The curve relating to step 5 is the torque Vs. speed characteristics of the motor at the rated voltage and frequency and a motor follows this curve from the beginning of step 5 and reaches its rated speed.

The application of the above invention is illustrated by way of examples in FIGS. 12–14 in respect of washing machines, refrigerators and air-conditioners. The multi-speed motor controller may be connected to the motor of the washing machine, refrigerator or air-conditioner with the help of gearbox if required and thus add versatility to the equipment that is being controlled. While the examples are typical applications of the technology, the same can be applied to other appliances and equipment where the induction motor is to be operated at various desired speed.

The above invention is also used in industrial equipment such as Textile Ring Frames, Portable Tools, Industrial Fans, Blowers & compressors and other machine tools.

What is claimed is:

1. A multi-speed motor controller for AC motor or brushless DC motor, comprising:
   a. a rectifier for rectifying the AC input to a DC;
   b. the rectifier is connected to a PWM bridge inverter consisting of power transistors with corresponding gates;
   c. the output of the PWM bridge inverter is connected to an AC motor or brushless DC motor;
   d. a controller unit connected to the PWM bridge inverter having a software program of short code length for determining the timing sequences for generating the signals for switching ON and OFF the gates of the power transistors of the PWM bridge inverter in order to produce Variable Voltage Variable Frequency (VVVF) sinusoidal voltage wave forms for controlling the speed of the AC motor or brushless DC motor using space vector pulse width modulation (SVPWM) or sinusoidal pulse width modulation (SPWM) technique; and
   e. an auxiliary power supply means for the controlling unit and the gates drivers connected to the DC input.

2. The multi-speed motor controller of claim 1, wherein the AC motor is a single-phase motor, a three phase motor or a poly-phase motor.

3. The multi-speed motor controller of claim 1, wherein the AC motor is an induction, reluctance or synchronous motor.

4. The multi-speed motor controller of claim 1, wherein brushless DC (BLDC) motor is in two or three phases with two or three pairs of winding.

5. The multi-speed motor controller of claim 1, wherein the PWM bridge inverter includes at least 4 power transistors with corresponding gates in case a single-phase motor is connected at its output.

6. The multi-speed motor controller of claim 1, wherein the software program provides not more than four switching configurations of the said inverter bridge to produce variable voltage variable frequency (VVVF) sinusoidal voltage wave form for controlling the speed of the single phase motor using space vector width modulation (SVPWM) or sinusoidal pulse width modulation (SPWM) technique.

7. The multi-speed motor controller of claim 1, wherein the PWM bridge inverter (three-phase inverter) includes at least six power transistors with corresponding gates and the AC motor connected to the output of PWM bridge inverter is a three-phase motor or brushless DC (BLDC) motor with three pairs of windings (three-phases).

8. The multi-speed motor controller of claim 1, wherein the software program provides not more than eight switching configurations of the inverter bridge to produce variable voltage variable frequency (VVVF) sinusoidal voltage wave form for controlling the speed of the said three phase motor or BLDC motor with three pairs of winding using space vector width modulation (SVPWM) or sinusoidal pulse width modulation (SPWM) technique.

9. The multi-speed motor controller of claim 1, wherein two single phase PWM bridges totaling eight power transistors are provided for BLDC motor with two pairs of winding (two-phase motor), the output of each of these two bridges is connected to the two winding pairs such that the output of second winding is delayed by 90° from the first one.

10. The multi-speed motor controller of claim 1, wherein the software program manipulates switching configurations of the inverter bridge to produce variable voltage variable frequency (VVVF) sinusoidal voltage wave form for controlling speed of the poly-phase motor using space vector width modulation (SVPWM) or sinusoidal pulse width modulation (SPWM) technique.

11. The multi-speed motor controller of claim 1, wherein the controller unit is a micro-controller with the associated processor, ROM, RAM and the input/output (I/O) ports having the software program in ROM to produce timing signals sent through the output port to the driver IC.

12. The multi-speed motor controller of claim 1, wherein the power transistors in the PWM bridge inverter are of MOSFET (metal oxide semi-conductor field effect transistor) type or insulated gate bipolar transistor (IGBT) type to make the gate driver circuitry simple.

13. The multi-speed motor controller of claim 1, wherein the timing sequences are such that the idle period of the bridge is distributed in three stages, one in the beginning, one in the middle and the third at the end of the PWM cycle in a manner that produces a symmetric pattern with respect to the center of the switching period.

14. The multi-speed motor controller of claim 1, wherein the software program in the micro-controller is such that it obtains the maximum utilization of the input DC voltage.

15. The multi-speed motor controller of claim 1, wherein the software program generates a symmetric pattern of timing signals thereby producing variable voltage variable frequency (VVVF) sinusoidal voltage wave forms with the least harmonic content.

16. The multi-speed motor controller of claim 1, wherein the short code length of the program is in range of 100–1000 bytes.

17. The multi-speed motor controller of claim 1, wherein the short code length of the program is preferably in range of 200–400 bytes.

18. The multi-speed motor controller of claim 1, wherein the software program includes means to generate dead band in the switching signals to ensure that at no point of time any two power transistors in the same leg of the PWM bridge inverter are conducting simultaneously.

19. The multi-speed motor controller of claim 1, wherein the software program includes means to obtain the set speed of the AC motor or brushless DC motor from the operator console.

20. The multi-speed motor controller of claim 1, wherein a driver to charge the gate capacitor is connected to the gate for turning the transistor 'ON'.

21. The multi-speed motor controller of claim 1, wherein the driver is a three-phase version gate driver IC to drive the three low sides and three high sides transistors of the PWM inverter.

22. The multi-speed motor controller of claim 1, wherein the auxiliary power supply means generates the 5V, 15V DC required for powering the micro-controller and the driver respectively.

23. The multi-speed motor controller of claim 1, wherein the software program further comprises soft-start means.

24. The multi-speed motor controller of claim 1, wherein the controller unit is implemented in ASIC (Application Specific Integrated Circuit).

25. The multi-speed motor controller of claim 1, wherein the ASIC and the passive components of the multi-speed motor controller are integrated in a hybrid IC.

26. The multi-speed motor controller of claim 1, wherein the ASIC comprises means to interface with an external memory chip, if required.

27. The multi-speed motor controller of claim 1, wherein the multi-speed motor controller is provided with means to interface with domestic appliances and industrial equipment to control the speed variation.

28. The multi-speed motor controller of claim 1, wherein the domestic appliances and the industrial equipment are selected from the group of washing machine, refrigerator, room air-conditioner, textile ring frame, fans, blowers, compressor and machine tools.

* * * * *